INVENTOR.
HAROLD ISAACS

Dec. 15, 1959     H. ISAACS     2,917,189
MOBILE BOOM AND CONTROL MECHANISM THEREFOR
Filed Sept. 18, 1957     2 Sheets-Sheet 2

INVENTOR.
HAROLD ISAACS
BY *Isler & Ornstein*
ATTORNEYS

őstates Patent Office 2,917,189
Patented Dec. 15, 1959

2,917,189

MOBILE BOOM AND CONTROL MECHANISM THEREFOR

Harold Isaacs, University Heights, Ohio, assignor to Edith Isaacs, University Heights, Ohio Application September 18, 1957, Serial No. 684,716

3 Claims. (Cl. 212—66)

The present invention relates generally to a mobile boom for the hoisting and transporting of various articles, and more particularly to a mobile boom for effecting the precise positioning of manufacturing aids and equipment, as well as the work pieces being machined or fabricated. Booms of this character are used for positioning dies, jigs or fixtures or for transporting and accurately positioning heavy castings, forgings or weldments on a machine tool.

It is a primary object of my invention to provide a boom of the character described which is subject to extremely accurate positioning control.

Another object of my invention is to provide a sensitive but rugged traversing mechanism for a precision boom.

A further object of my invention is to provide improved support means for the movable boom.

Still another object of my invention is to provide an improved lifting hook for a precision boom.

Other objects and advantages of my invention will be apparent during the course of the following description.

In the accompanying drawings forming a part of this specification, and in which like numerals are employed to designate like parts throughout the same.

Figures 1, 3, 7:
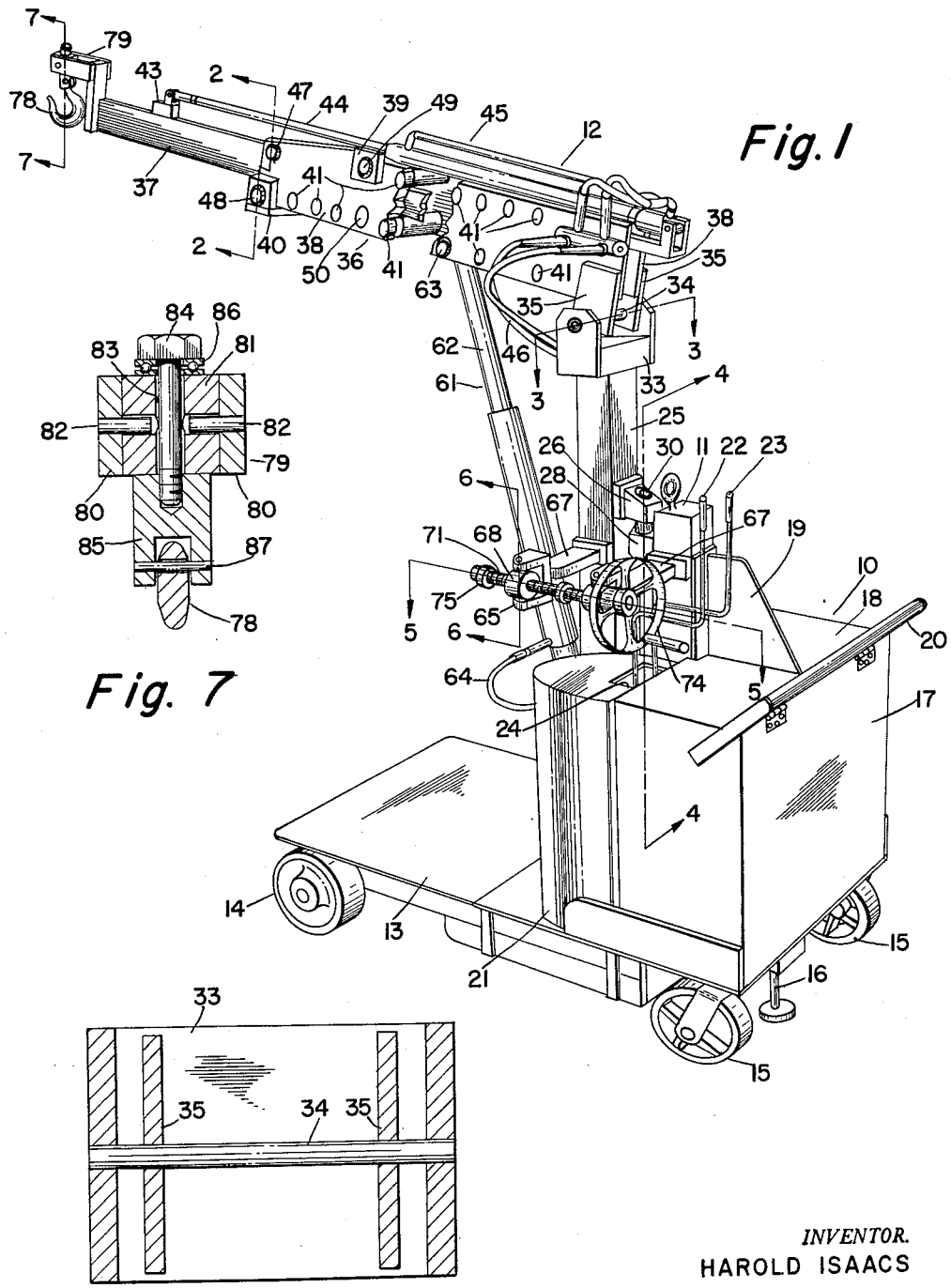
Fig. 1 is a perspective of a mobile boom unit embodying the features of my invention.
Fig. 3 is a cross-sectional view taken on line 3—3 of Fig. 1 and showing details of the horizontal axis of rotation of the boom.
Fig. 7 is a cross-sectional view taken on line 7—7 of Fig. 1 and showing details of the swivel hook.
Figure 4:
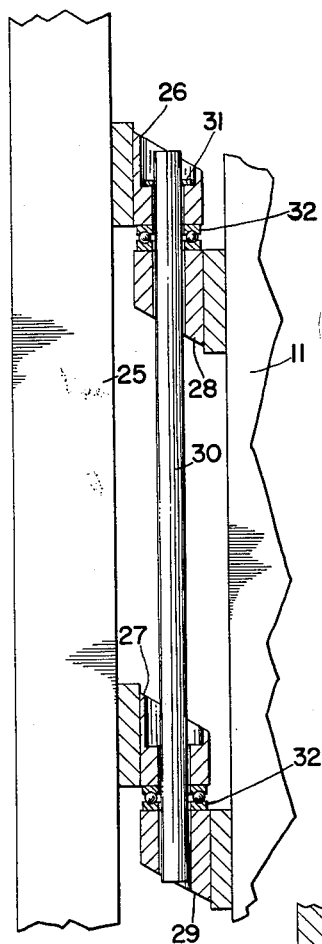
Fig. 4 is a cross-sectional view taken on line 4—4 of Fig. 1 and showing details of the vertical axis of rotation of the boom.

Referring more particularly to Figs. 1 to 4 of the drawings, I have shown a truck-mounted boom unit which includes a truck 10 which supports a mast 11 on which is movably mounted a boom assembly 12.

The truck 10 comprises a bed or platform 13 mounted on wheels 14, which may be fixed or non-steerable, and wheels 15 which are swivel-mounted so that the truck may be steered in a desired direction. A conventional ground-engaging brake 16 is utilized to frictionally hold the truck against movement when it is not being utilized for transport.

Mounted on the rear of the platform 13 is a ballast box 17 having a slotted hinged lid 18. The box 17 is adapted to contain counter-weights to the extent necessary to prevent the load on the boom unit from overbalancing the truck. When the boom unit is powered by electrical batteries, the box 17 may also serve as the battery box, and a partition 19 is provided for such purpose. Secured to the box 17 and extending rearwardly thereof is a pushbar 20 by means of which the truck 10 may be manually pushed or pulled.

Also mounted on the truck platform 13 is a housing 21 within which is mounted a conventional motor-driven pump mechanism and its associated valves (not shown) which provide a circulating hydraulic pressure system for the energization of the boom unit. Control levers 22 and 23 extend through an aperture 24 in the housing so as to be within easy reach of the operator. As previously indicated, the power supply for the hydraulic system is preferably furnished by electrical batteries, but may be through connection to a power transmission line, or through other suitable power or manual means.

Rigidly secured to the platform adjacent the rearward end thereof is the mast 11 in the form of a structural box member which projects vertically from the platform 13. As will appear more fully hereinafter, the mast 11 supports the boom assembly 12 and its associated actuating means.

The boom assembly 12 includes a boom support in the form of an upright column or standard 25 which is provided with a pair of vertically-spaced journal blocks 26 and 27. The mast 11 is provided with vertically-spaced upper and lower support blocks 28 and 29, respectively, which are adapted to underlie and be aligned with the blocks 26 and 27. A hinge rod 30 slidably traverses the aligned blocks 26, 28, 27 and 29 and is held against downward movement by a retaining collar 31 which is fixed to the upper end of the rod 30 and abuts the block 26. Thrust bearings 32 are interposed between each pair of upper and lower blocks and serve to provide a substantially friction-free mounting for the pivoted movement of the column 25 relatively to the mast 11. The column 25 is thus arranged to have a limited movement about a vertical axis relatively to the truck 10.

The upper end of the column 25 is surmounted by a yoke 33 in which is fixed a transverse shaft or rod 34 to which is pivotally secured, as by spaced ears 35, a hollow boom 36 having a telescopic extension or arm 37. The boom 36 may be of any desired shape and is herein illustrated as being a modified form of channel member consisting of parallel sides 38 which are rigidly connected by an upper strap 39 and a lower strap 40 near the forward end of the boom, and by a plurality of upper and lower transverse rods 41 which are fixed to the sides 38 at spaced points rearwardly of the straps 39 and 40.

The extensible boom arm 37 is of a size and shape to be accommodated in the hollow boom 36 and is shown herein as a solid member of rectangular cross-section. The upper edge or face 42 of the arm 37 has a connector element 43 secured thereto which is pivotally connected to the end of a plunger 44 which forms part of a double-acting hydraulic cylinder assembly 45 mounted on the boom 36. The cylinder assembly serves as the actuating means for effecting linear extension and retraction of the arm 37, and is connected to the pump mechanism by means of suitable conduits or hose 46.

The arm 37 is guided and supported in its linear movement by means of a series of spaced supports which are mounted on the boom 36. In order to minimize frictional resistance, the supports are preferably of the roller type. Four of such supports are shown and are designated as an upper front support 47, a lower front support 48, an upper rear support 49 and a lower rear support 50. With the exception of the support 47, the supports are of similar structure so that a description of the support 48 will also suffice to describe the supports 49 and 50.

The lower front support 48 includes a shaft 51 which is rotatably mounted in bearings 52 so as to extend between the sides 38 of the boom 36. Secured to the shaft, as by pin 53, for rotation therewith, is a cylindrical roller 54 having a median circumferential recess 55 which is of a width sufficient to accommodate and receive the lower edge 56 of the arm 37. When there is a normal load applied to the end of the arm 37, the support 48 serves as the fulcrum for the load and the upper rear support 49 serves as a reaction member. To a lesser extent the upper front support 47 also serves as a reaction member. However, if through accident or inadvertence or misuse, an upward thrust or load is applied to the end of arm 37, then the upper front support 47 serves as the fulcrum for the load and the lower rear support 50 serves as the reaction member to resist the thrust. The lower front support 48 also serves to some extent as a reaction member.

Figure 2:
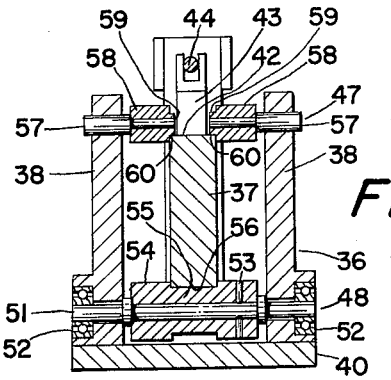
Fig. 2 is a cross-sectional view taken on line 2—2 of Fig. 1 and showing details of the forward boom supporting means.

As best seen in Fig. 2, the upper front support 47 includes a pair of aligned stub shafts 57 mounted on the opposed sides 38 of the boom 36. On each shaft 57 is rotatably mounted a cylindrical roller 58 which terminates in a portion 59 of reduced diameter to form a shoulder 60. The rollers are of such dimension that the portions 59 overly the margins of the upper edge 42 of the arm 37 and the shoulders 60 of the opposed rollers accommodate and receive the width of the arm 37. This arrangement provides unobstructed passage of the connector element 43 into the boom 36 without interference from the front support 47, thus permitting the use of a wider range of linear movement or plunger stroke than would otherwise be possible.

A hydraulic cylinder assembly 61 is pivotally-secured to the column 25 and has an upwardly extending plunger 62 which is pivotally connected to the boom 36, as by a cross-pin 63, forwardly of the pivot rod 34. The cylinder assembly 61 serves as the elevating mechanism or actuating means for the boom 36 and is connected to the pump mechanism by a suitable hose or conduit 64.

The lever 22 is utilized to control the action of cylinder assembly 45 and the lever 23 controls the action of the cylinder assembly 61 by manipulation of the conventional valves heretofore mentioned.

Figure 6:
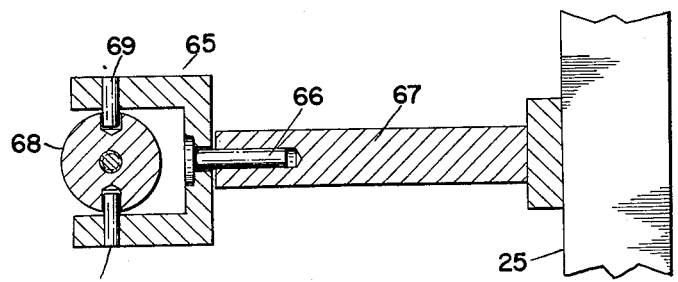
Fig. 6 is a cross-sectional view taken on line 6—6 of Fig. 1 and showing further details of the traversing mechanism.
Figure 5:
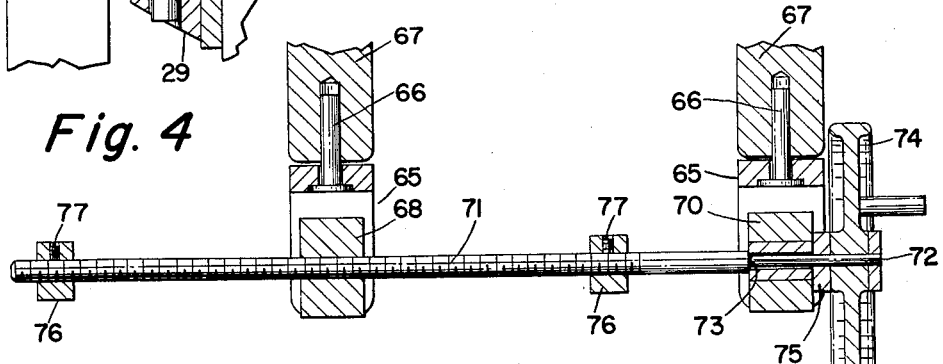
Fig. 5 is a cross-sectional view taken on line 5—5 of Fig. 1 and showing details of the traversing mechanism of the boom.

Referring more particularly to Figs. 1, 5 and 6, the boom assembly also includes a traversing mechanism for effecting sensitive pivotal movement of the column 25 about the axis defined by the hinge rod 30. The traversing mechanism could be power-operated, but I have found it preferable to utilize hand operation as this permits a flexibility of operation which is particularly desirable for the traversing movement.

The traversing mechanism includes a front yoke element 65 which is pivotally secured as by horizontal pin 66 to an arm 67 which is fixed to the column 25. A rear yoke element 65 is likewise pivotally secured to an arm 67 which is fixed to the mast 11, so that both yokes are aligned with each other. A screw-threaded bearing element or nut 68 is pivotally secured to the front yoke 65 by means of stub shafts 69 which are fixed to the arms of the yoke and define an axis of rotation which is normal to the axis of rotation defined by the pin 66. A bearing element 70 is similarly pivotally secured to the rear yoke 65 in axial alignment with the nut 68.

A rod 71 is screw-threaded for a portion of its length and threadedly engages the nut 68. The rod 71 terminates in a portion 72 of reduced diameter, thus forming a shoulder 73. The shoulder abuts one side of the bearing element 70 which is traversed by the portion 72. A hand wheel 74 is secured to the end of the portion 72 so that the rod 71 is retained longitudinally immovable relatively to the bearing element 70 by the hand wheel 74 and the shoulder 73, although it is freely axially rotatable. For convenience of manufacture, a spacer 75 may be utilized in the assembly of the handwheel to the rod.

When the rod 71 is rotated in one direction by means of the handwheel 74, the screw-threads will cause the nut 68 to be displaced longitudinally of the rod 71 so as to cause rotation of the arm 67 and column 25 in a clockwise direction (as viewed in Fig. 5) about the vertical axis of rotation defined by the hinge rod 30. It will be apparent that as the column 25 is rotated it will cause a traversing movement of the boom 36 and its associated cylinder assemblies.

As the nut 68 is displaced, it follows an arcuate path of movement about the hinge rod 30 which would normally tend to cause binding or jamming of the screw threads. However, the described structure permits the nut 68 and the bearing element 70 to pivot about their respective vertical axes of rotation to maintain proper axial alignment during the horizontal displacement of the nut 68.

I have also found that when the boom is under load, there is some degree of distortion of the structural members which tends to rotate the column 25 forwardly relatively to the mast 11 with a corresponding arcuate vertical displacement of the nut 68. Ordinarily this degree of load-induced distortion is insignificant or may be reduced to insignificance by utilizing massive and extremely rigid structural components. However, in a sensitive traversing mechanism, as herein described, in which a fine thread arrangement is employed and the manufacturing tolerances and clearances are very close, even a normally insignificant degree of vertical distortion could interfere with the smooth and precise operation of the screw rod 71. As the use of massive structural elements would increase costs and tend to negate the portability of the mobile boom unit, I have compensated for such load-induced distortion by permitting the yokes 65 to pivot about their horizontal axes of rotation to maintain proper axial alignment in response to the vertical displacement of the front yoke relatively to the rear yoke.

Thus, the bearing elements 68 and 70 are so mounted as to permit compensating aligning movement in response to both vertical and horizontal displacement of the nut 68 relatively to the bearing 70.

It will be understood that reverse rotation of the handwheel 74 will cause counter-clockwise rotation of the column 25. One or more collars 76 may be threadedly secured to the rod 71 and may be held in a desired location thereon by means of a pin or screw 77, so as to limit the traversing movement in either or both directions of rotation.

Referring more particularly to Figs. 1 and 7, I have shown a swivel lifting hook 78 which is carried by a bracket 79 fixedly secured to the forward end of the extension arm 37. As best seen in Fig. 7, the bracket is provided with two spaced forwardly extending ears 80 between which is pivotally mounted a support block 81, as by stub shafts 82. The block 81 is provided with a bore 83 in a direction normal to the axis of the stub shafts 82. A bolt 84 traverses the bore 83 and threadedly engages and secures a swivel block 85 for pivotal movement relatively to the support block 81. A thrust bearing 86 is interposed between the head of the bolt 84 and the block 81, so as to minimize frictional resistance during the relative movement between the parts.

The lifting hook 78 is pivotally secured to the swivel block 85 by a transverse rod or pin 87. By this arrangement, the hook 78 is effectively movable about three pivotal axes so that it will maintain itself aligned with the position of the load irrespective of the position or movement of the boom.

In utilizing the above described boom unit, the truck is wheeled into position adjacent to the article or load to be lifted. The brake 16 is engaged to immobilize the truck and the levers 22 and 23 and the handwheel 74 are manipulated to bring the hook 78 into engagement with the load. The control lever 23 is then manipulated to cause elevating movement of the boom 36, through plunger 62, to cause the load to be lifted. The load may be transported in its suspended position or the arm 37 may be retracted and the boom lowered to deposit the load on the platform 13 of the truck for transport.

After transport, the truck is again immobilized by the operation of the brake 16 and the load may be accurately positioned in its desired location by means of concurrent or progressive manipulation of the controls 22, 23 and 74. The support means for the extension arm 37 provide for accurate and friction-free telescoping movement of the arm, even under relatively heavy loads. The boom unit and its actuating mechanism is so designed that mobility and flexibility of operation are attained while maintaining precision and accuracy of positioning within .010 inch.

It is to be understood that the form of my invention, herewith shown and described, is to be taken as a preferred example of the same, and that various changes may be made in the shape, size and arrangement of parts of my invention, without departing from the spirit of the invention or the scope of the subjoined claims.

Having thus described my invention, I claim:

1. In a mobile boom unit, the combination of a truck, a standard pivotally mounted on said truck for movement about a vertical axis, a boom pivotally secured to said standard for movement about a horizontal axis, an elevating mechanism carried by said standard and operatively engaging said boom to effect rotation thereof, and a traversing mechanism mounted on said truck and operatively engaging said standard to effect rotation thereof, said traversing mechanism comprising a first bearing element pivotally mounted on said truck for movement about vertical and horizontal axes, a second bearing element pivotally mounted on said standard for movement about vertical and horizontal axes, a horizontal rod rotatably journalled in said bearing elements, and means responsive to axial rotation of said rod for moving one of said bearing elements relatively to the other of said bearing elements to cause rotation of said standard.

2. In a mobile boom unit, the combination of a truck, a standard pivotally mounted on said truck for movement about a vertical axis, a boom pivotally secured to said standard for movement about a horizontal axis, an elevating mechanism carried by said standard and operatively engaging said boom to effect rotation thereof, and a traversing mechanism mounted on said truck and operatively engaging said standard to effect rotation thereof, said traversing mechanism comprising a first bearing element pivotally mounted on said truck for movement about vertical and horizontal axes, a second bearing element pivotally mounted on said standard for movement about vertical and horizontal axes, a horizontal rod rotatably journalled in said bearing elements, means provided on said rod for securing said rod against longitudinal displacement relatively to one of said bearing elements, and means provided on said rod to effect longitudinal displacement of said rod relatively to said other bearing element in response to axial rotation of said rod, whereby to cause rotation of said standard.

3. A combination as defined in claim 2, wherein said last-named means comprises a screw thread on said rod, and said rod threadedly engages said other bearing element.

References Cited in the file of this patent

UNITED STATES PATENTS

| | | |
|---|---|---|
| 363,066 | Harris | May 17, 1887 |
| 900,647 | Beard | Oct. 6, 1908 |
| 1,506,697 | Warman | Aug. 26, 1924 |
| 2,382,299 | Deiters | Aug. 14, 1945 |
| 2,718,311 | Cain | Sept. 20, 1955 |
| 2,787,383 | Antos | Apr. 2, 1957 |

FOREIGN PATENTS

| | | |
|---|---|---|
| 16,838 | Great Britain | July 31, 1903 |
| 391,777 | Great Britain | Apr. 26, 1933 |